(12) United States Patent
Wong (10) Patent No.: US 10,518,430 B2
(45) Date of Patent: Dec. 31, 2019

(54) SLICER

(71) Applicant: Yan Kwong Wong, Kowloon (HK)

(72) Inventor: Yan Kwong Wong, Kowloon (HK)

( * ) Notice: Subject to any disclaimer, the term of this patent is extended or adjusted under 35 U.S.C. 154(b) by 189 days.

(21) Appl. No.: 14/771,185

(22) PCT Filed: Jan. 2, 2015

(86) PCT No.: PCT/IB2015/050022
§ 371 (c)(1),
(2) Date: Aug. 27, 2015

(87) PCT Pub. No.: WO2015/107432
PCT Pub. Date: Jul. 23, 2015

(65) Prior Publication Data
US 2016/0257012 A1   Sep. 8, 2016

(30) Foreign Application Priority Data

Jan. 15, 2014   (AU) ................................ 2014900123

(51) Int. Cl.
*A23N 7/02*   (2006.01)
*A47J 17/16*   (2006.01)
(Continued)

(52) U.S. Cl.
CPC ................ *B26D 3/11* (2013.01); *A23N 7/026* (2013.01); *A47J 17/16* (2013.01); *B26D 3/26* (2013.01);
(Continued)

(58) Field of Classification Search
CPC ... B26D 3/11; B26D 3/26; B26D 1/02; B26D 5/10; B26D 7/0608; B26D 7/0616; B26D 7/0666; B26D 7/2614; B26D 2007/0018; B26D 2210/02; A23N 7/02; A47J 17/16; Y10S 83/932; Y10T 83/654; Y10T 83/6547; Y10T 83/6548; Y10T 83/6552; Y10T 83/6555; Y10T 83/6584; Y10T 83/66; Y10T 83/6608; Y10T 83/6614;
(Continued)

(56) References Cited

U.S. PATENT DOCUMENTS

| 850,878 A | * | 4/1907 | Pringle | ..................... F22D 7/04 |
| | | | | 122/429 |
| 1,072,450 A | * | 9/1913 | Hamblin | ............... B26B 29/063 |
| | | | | 83/553 |

(Continued)

FOREIGN PATENT DOCUMENTS

| CN | 1986172 A | * | 6/2007 |
| CN | 201998195 U | | 10/2011 |

(Continued)

*Primary Examiner* — Clark F Dexter
(74) *Attorney, Agent, or Firm* — Muncy, Geissler, Olds & Lowe, P.C.

(57) ABSTRACT

A slicer is provided. The slicer comprises a body (1), a food mounting device (3), a food cutting device (4), and a cover (2). The cover (2) is removably mounted to the body (1). The food mounting device (3) is adapted for mounting food on the food cutting device (4). The food cutting device (4) is adapted for cutting the food mounted by the food mounting device (3). The body (1) comprises a first receiving portion (51) adapted for receiving the food cutting device (4) inside the body (1).

18 Claims, 12 Drawing Sheets

(51) Int. Cl.
 *B26D 3/11* (2006.01)
 *B26D 3/26* (2006.01)
 *B26D 7/06* (2006.01)
 *B26D 7/26* (2006.01)
 *B26D 7/00* (2006.01)

(52) U.S. Cl.
 CPC ......... *B26D 7/0608* (2013.01); *B26D 7/0666* (2013.01); *B26D 7/2614* (2013.01); *B26D 2007/0018* (2013.01); *B26D 2210/02* (2013.01); *Y10S 83/932* (2013.01); *Y10T 83/6667* (2015.04); *Y10T 83/9493* (2015.04)

(58) Field of Classification Search
 CPC ............... Y10T 83/6657; Y10T 83/666; Y10T 83/6667; Y10T 83/695; Y10T 83/9493; Y10T 83/9495; Y10T 83/9498; Y10T 83/95
 USPC ...... 83/762, 409, 410.7, 410.8, 411.1, 411.3, 83/425, 431, 435.11, 435.15, 437.2, 83/437.4, 733, 856–859, 932; 99/589, 99/594, 595
 See application file for complete search history.

(56) References Cited

U.S. PATENT DOCUMENTS

| | | | | |
|---|---|---|---|---|
| 2,398,192 | A * | 4/1946 | Scheminger, Jr. | B26B 29/063 83/762 |
| 2,464,993 | A * | 3/1949 | Ross | B26D 3/11 82/173 |
| 3,211,202 | A * | 10/1965 | Mason | A47J 17/16 83/425.1 |
| 3,874,259 | A * | 4/1975 | Chambos et al. | B26D 3/08 83/408 |
| 3,952,621 | A * | 4/1976 | Chambos | B26D 1/03 83/408 |
| 3,971,273 | A * | 7/1976 | Peters et al. | B26D 1/25 83/157 |
| D254,590 | S * | 4/1980 | Doyel | 83/733 |
| 4,246,821 | A | 1/1981 | Fuse | |
| 5,577,430 | A * | 11/1996 | Gunderson et al. | A21C 15/04 83/454 |
| 5,611,266 | A * | 3/1997 | Kensrue | A21C 15/04 269/87.2 |
| 5,680,803 | A * | 10/1997 | Vizurraga et al. | B26B 29/063 83/468.5 |
| 5,690,022 | A * | 11/1997 | Cha | A47J 17/16 99/541 |
| 5,784,942 | A * | 7/1998 | Jones | B26D 1/02 83/733 |
| 5,950,528 | A * | 9/1999 | Wang | A23N 7/026 99/542 |
| D414,983 | S * | 10/1999 | Wong | D7/381 |
| 6,053,098 | A * | 4/2000 | Yamamoto | B26D 3/11 83/425.1 |
| 7,077,058 | B2 * | 7/2006 | Muro | A47J 17/16 99/541 |
| D669,324 | S * | 10/2012 | Bodum | D7/693 |
| 2004/0194597 | A1 | 10/2004 | Graziano | |

FOREIGN PATENT DOCUMENTS

| | | |
|---|---|---|
| CN | 202862268 U * | 4/2013 |
| EP | 2199041 A1 | 6/2010 |
| WO | WO 95/29045 | 11/1995 |

* cited by examiner

SLICER

FIELD OF THE INVENTION

The present invention relates broadly to a kitchenware. More specifically, the present invention relates to a slicer.

BACKGROUND OF THE INVENTION

Through the technological development of our society, more and more people choose to use professional slicing devices to cut food, such as fruits, vegetables and the like, in order to replace the use of traditional flat cutters. The reason is that the functionality of professional slicer is not only much more powerful than the traditional flat cutter, it also can cut food into different shapes and can provide us convenience and safety in our use of slicers.

Referring to a Chinese Utility Model number CN202097758U (the title of invention: a hand-operated potato cutting machine), it discloses a potato cutting machine which can cut potatoes more efficiently. However, it is large in its size and is not foldable. Further, its parts are not able to be detached such that the above machine is not easy to be carried. The above machine is easy to get dusty during storage and is difficult to clean up.

SUMMARY OF THE INVENTION

The problem to be solved in the present invention is to solve the technical problem of the existing slicer that is unable to be folded which is not of a compact construction and inconvenient for storage. Another problem to be solved in the present invention is to provide a portable slicer with a convenient means for use, carrying and self-storage. A further problem to be solved in the present invention is to provide a slicer adapted for substantially receiving all the food being cut by the slicer.

The present invention provides a slicer comprising a body; a food mounting device; a food cutting device; a cover; said cover being removably mounted to said body; said food mounting device adapted for mounting food on said food cutting device; said food cutting device adapted for cutting the food mounted by said food mounting device; and said body comprising a first receiving portion adapted for receiving said food cutting device inside said body.

Typically, said food cutting device is pivotally mounted to said body.

Typically, said food cutting device comprises a first cutting member and a mounting plate, said first cutting member is removably mounted to said mounting plate.

Typically, said food cutting device further comprises a second cutting member, said body further comprises a second receiving portion adapted for receiving said first and second cutting members.

Typically, said first cutting member comprises a first cutting element, said first cutting element is adapted for cutting the food being mounted to said food mounting device, said first cutting element is mounted on said first cutting member.

Typically, said body further comprises a pivoting device being arranged inside said body, an end portion of said mounting plate is pivotally mounted to said pivoting device, said mounting plate is adapted to be rotated about said pivoting device.

Typically, said slicer further comprises a food cutting positioning member adapted for allowing said food cutting device to be of a fixed position which is vertical to the body during the cutting process, said food cutting positioning member is positioned on an end portion of said cover facing said food cutting device.

Typically, said food cutting positioning member is an end face of said cover facing said food cutting device, said end face of said cover is removably mounted to a corresponding face of said food cutting device.

Typically, said food mounting device comprises a first positioning element, a driving element and a mounting element, said first positioning element is adapted to mount the food, said driving element is adapted for transmission of driving force, said mounting element is adapted for mounting said driving element and said first positioning element, said mounting element is slidingly mounted on said cover.

Typically, said food mounting device further comprises a longitudinal member adapted for receiving the food being cut by passing through said food cutting device, said longitudinal member is removably mounted to said food cutting device.

Typically, said food mounting device further comprises a second positioning element mounted to a first face of said first cutting member, said second positioning element is adapted for mounting the food.

Typically, said food cutting device further comprises a second cutting element, said second cutting element is of a pyramidal shape or a conical shape, said second cutting element is vertically arranged on a first face of said first cutting member.

Typically, said food cutting device further comprises a first guiding element arranged on a second face of said first food cutting member, said first guiding element is adapted for preventing the food from cut through said food cutting device from broken up by said mounting plate.

Typically, said body further comprises a locking device, said cover comprises a positioning device, said cover and said body are adapted to be mounted together when said locking device is in a locked position.

Typically, at least two second guiding elements are arranged on said second face of said first cutting member, said at least two second guiding elements are adapted for preventing the food from cut through said food cutting device from broken up by said mounting plate, at least one side of said second guiding element is mounted to an inner wall of said first cutting member, said at least two second guiding elements are not in a parallel relationship.

Typically, a unitary "L" shaped structure is formed between said food cutting device and said cover.

Typically, said second positioning element is defined by a convex structure mounted on said first cutting member.

During the process of food cutting (including carrot, potato and cucumber), the body is mounted to the cover and forms a base for food cutting. An end of the food is mounted on the food mounting device, the food mounting device is driven to move along the cover by external force so that the food can be cut through the food cutting device into corresponding shapes (such as a screw shape and a plane shape). When the food cutting is not in need, the food cutting device can be dismounted or rotated about the pivoting device so as to be stored inside the body. The food mounting device can also be dismounted and stored inside the body for the purpose of saving storage space, easy carrying and disallowing dust accumulation.

BRIEF DESCRIPTION OF THE DRAWINGS

This and other objects, features and advantages of the invention will become apparent upon reading of the following detailed descriptions and drawings, in which.

DESCRIPTION OF THE PREFERRED EMBODIMENTS

Referring to FIGS. 1-13, in the first embodiment, a slicer of this embodiment comprises a body 1, a cover 2, a food mounting device 3 and a food cutting device 4, which is not simply to demonstrate the functionality of food cutting, it also achieves the technical results of saving storage space, easy carrying and preventing the slicer from getting dusty.

In this embodiment, the body 1 can be of a hollow structure which is removably mounted to the cover 2. The food mounting device 3 is adapted for mounting food on the food cutting device 4. The food cutting device 4 is adapted for cutting the food being mounted by the food mounting device 3. And the body 1 comprises a first receiving portion 51 for receiving the food cutting device 4 inside the body 1.

Figure 5:
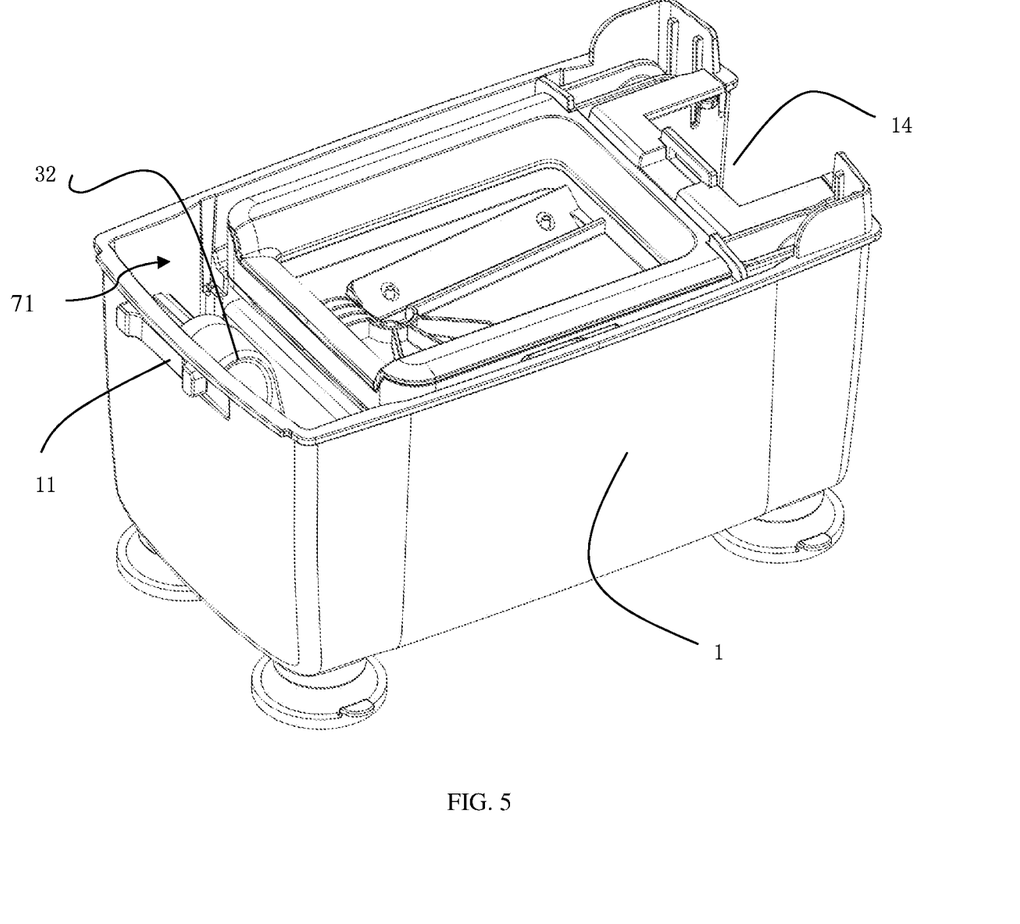
FIG. 5 is a fourth perspective view in the open position of the slicer of FIG. 2.

Preferably, the food cutting device 4 can be pivotally mounted to said body 1. Preferably, the slicer further comprises a pivoting device 5 and the body 1 also mounted to the pivoting device 5. Preferably, the pivoting device 5 is arranged inside the body 1. Particularly, the body 1 is respectively mounted to the cover 2 and the pivoting device 5 through locking mechanisms, such as clamping. In another embodiment, the body 1 can be of a partly hollow structure in which the body has a sufficient space to receive the food mounting device 3 and/or the food cutting device 4. Preferably, referring to FIGS. 4-10, the body 1 further comprises a second receiving portion 52 for receiving a cutting member. Preferably, the second receiving portion 52 can receive at least two cutting members, such as a first cutting member 422, a second cutting member 522 or a third cutting member 622. The second receiving portion 52 can be defined by a covering plate 53 which covers the second receiving portion 52 and prevents the cutting members from being moved out of the body 1. The structure of mounting the body 1 to the cover 2 can be the same or similar with that of mounting the body 1 to the pivoting device 5. Mounting structures such as a hinge connection, a sliding connection, a plug connection or the like can also be applied to the above parts. In this embodiment, a main base component of the slicer to perform food cutting can be formed through the unitary structure of the body 1 and the cover 2 after being mounted together. Typically, the food cutting device 4 can be rotated after mounting between the body 1 and the pivoting device 5. Preferably, referring to FIG. 3, an end portion of a mounting plate 421 is pivotally mounted to the pivoting device 5 and the mounting plate 421 can be rotated about the pivoting device 5. The food cutting device 4 can also be pivotally mounted to the body 1 through a hinge structure. Referring to FIG. 5, the body 1 can comprise a first concave region 71 for receiving a driving element 32 positioned inside the side portion of the body 1. Alternatively, referring to FIG. 1, the slicer can comprise a food residue receiver 6 for receiving the food residues and is removably mounted to the cover 2 and the body 1.

In this embodiment, the slicer can further comprise a first positioning element 31. The first positioning element 31 can comprise at least one positioning element 311 which is used for mounting the food to a position of the slicer. The shape of the positioning element 311 can either be of a pyramidal shape, a conical shape including a straight pyramidal shape, an oblique pyramidal shape, a trapezoid shape, or be of a triangle shape, a trapezoid shape and the like. In particular, the thickness of the positioning element is very thin which can be of a triangle shape, a trapezoid shape or the like. When two or more positioning elements 311 are arranged in this embodiment, the positioning elements 311 are preferably arranged in the form of even distribution on a surface of the first positioning element 31.

Typically, the food cutting device 4 can be mounted to the pivoting device 5 in order that the food cutting device 4 is allowed to be rotated about the pivoting device 5. Alternatively, the food cutting device 4 is received inside the body 1 and can also be mounted vertically to the body 1 for the purpose of performing the food cutting process at a late stage. In this embodiment, it is preferred that the above mounting structure to be arranged between the food cutting device and the pivoting device 5 can be construed as a removably mounting structure. Then, the food cutting device 4 can easily be detached from the pivoting device 5 and further be received inside the body 1.

When the food (such as carrot, potatoes and cucumber) needs to be cut, a main base component of the slicer for food cutting is to be formed by mounting between the body 1 and the cover 2. First, an end of the food is required to be fixed to the food mounting device 3. Then, the food mounting device 3 will move along the cover 2 driven by an external force so that the food will then be cut into a corresponding shape through the food cutting device 4, such shape can be of a screw-like or a flat shape. When the slicer is not in operation or not in the open position, the food cutting device 4 can then be dismounted or rotated about the pivoting device 5 to a position which can be received inside the body 1. Furthermore, the food mounting device 3 can also be dismounted and received inside the body 1 for the purpose of saving storage space, easy carrying and avoiding the slicer being dusty.

In a second embodiment of the present invention, the food cutting device 4 comprises a first cutting member 422, a first cutting element 41 can be construed as a flat blade and is mounted to the face of the first cutting member 422. The first cutting element 41 is used for cutting the food which is mounted to the food mounting device 3. The food cutting element 41 is mounted on the first cutting member. The mounting plate 421 or food cutting device 4 can be rotated about the pivoting device 5 so as to be received inside the body or the first receiving portion 51. When the slicer is under operation or in the open position and the food will then be cut through the slicer, the mounting plate 421 or food cutting device 4 can also be rotated about the pivoting device 5 to a position vertically on the body 1.

Preferably, the slicer can comprise a food cutting positioning member 61 for restricting the motion of the food cutting device 4 during the cutting process for the purpose to eliminate any adverse cutting effect due to such motion. Preferably, the food cutting positioning member 61 only allows the food cutting device 4 to be of a fixed position which is vertically to the body 1. The food cutting positioning member 61 is arranged on an end portion of the cover 2 facing the food cutting device 4. The food cutting positioning member 61 is removably mounted to a portion of the slicer 4. Further, the food cutting positioning member 61 is an end face of the cover 2 facing the food cutting device 4. The end face of the food cutting device 4 is removably mounted to a corresponding face of the food cutting device 4. Preferably, when the food cutting device 4 rotates to a position which is of a 90 degree angle to the cover 2 or which is of a vertical position to the body, a unitary "L" shaped structure will then be formed between the food cutting device 4 and the cover 2. Such a unitary "L" shaped structure for securing the stability of the food cutting device 4 during a cutting process is maintained by the food cutting positioning member 61 so as to avoid any rotating movement of the food cutting device 4.

Alternatively, the food cutting device 4 can further comprise the second cutting member 522, the second cutting member 522 can comprise the first cutting element 41 and the second cutting element 43. In this embodiment, the second cutting element 43 can be of a pyramidal shape or conical shape or the like. The second cutting element can be arranged vertically on the first cutting member 422. When more than two second cutting elements 43 are arranged, the second cutting elements 43 are preferably evenly distributed on the first cutting member 422. The food after being passed through the second cutting elements 43 from the food mounting device 3 will then be evenly cut by the second cutting elements. Furthermore, the food can therefore be cut more efficiently and accurately under the cutting process of the first and second cutting elements.

Figure 6:
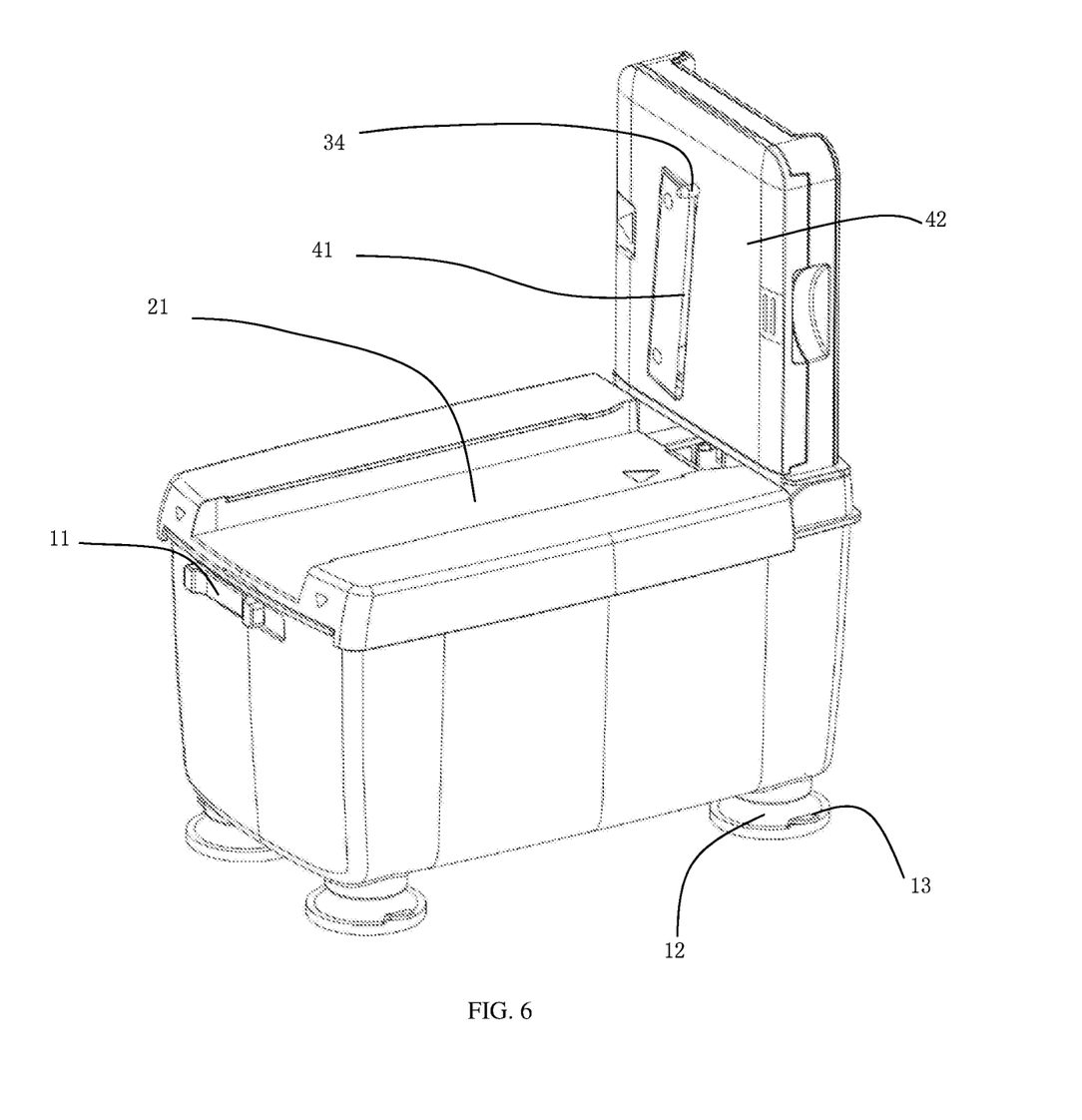
FIG. 6 is a fifth perspective view in the open position of the slicer of FIG. 2.
Figure 7:
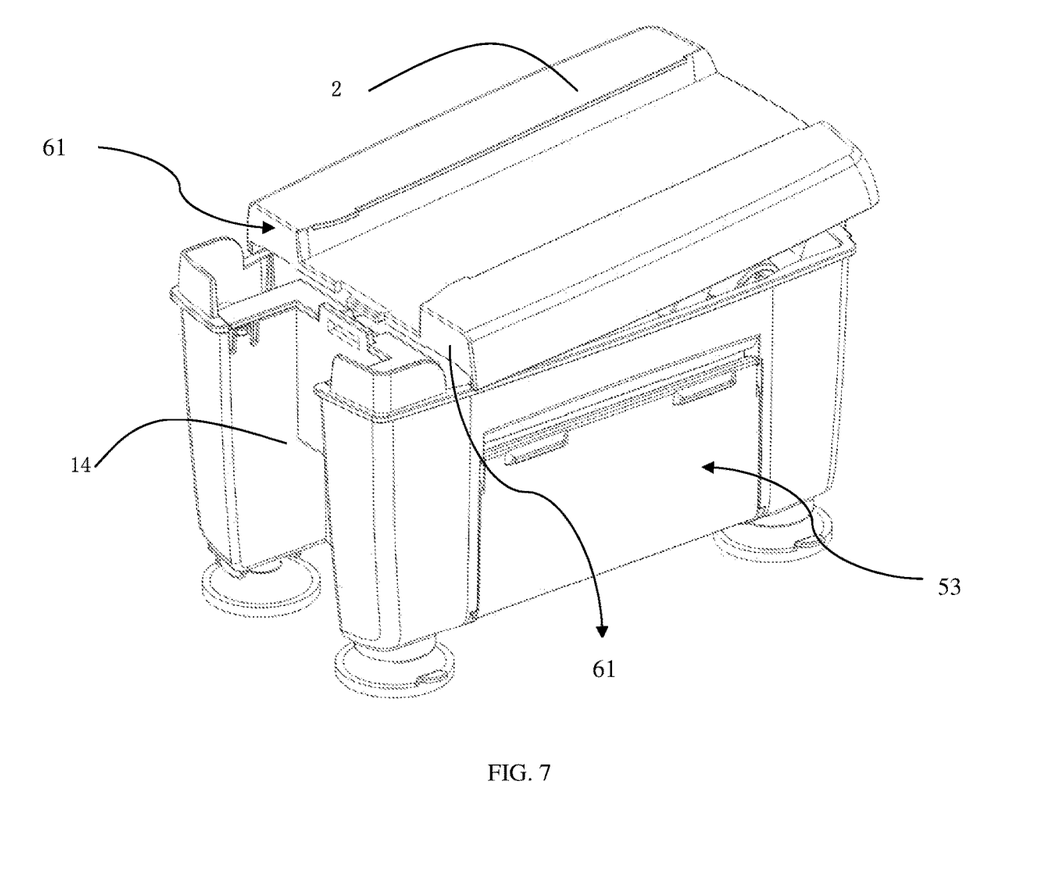
FIG. 7 is a first perspective view in a closed position of the slicer of FIG. 2.
Figure 8:
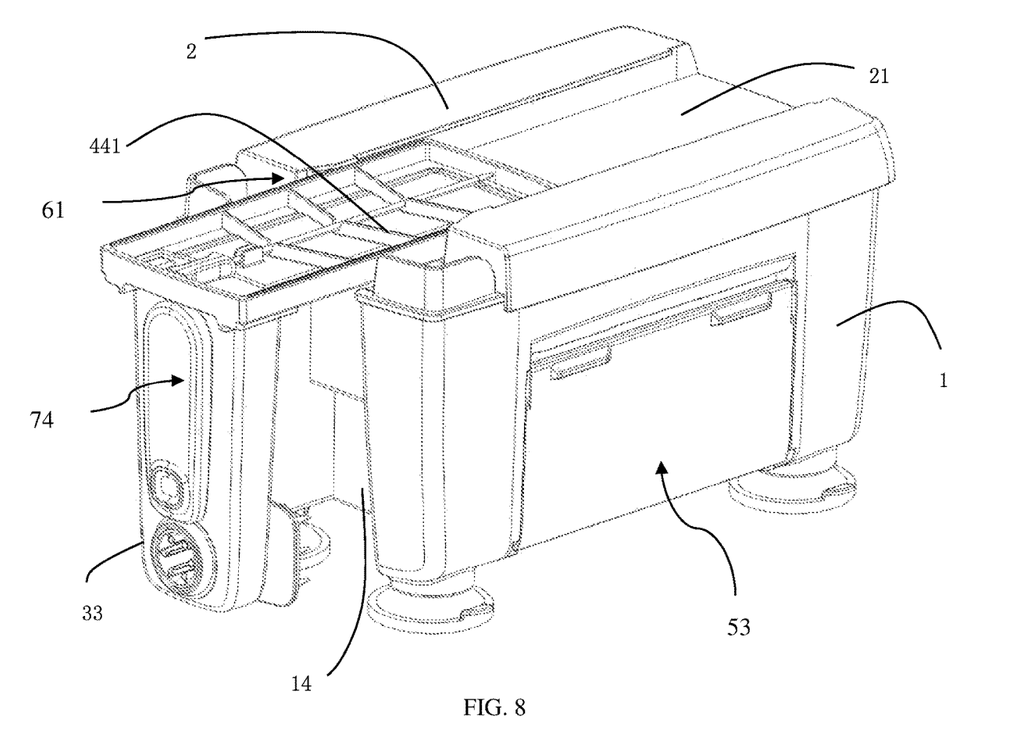
FIG. 8 is a second perspective view in the closed position of the slicer of FIG. 2.

Alternatively, referring to FIG. 6, the food cutting device 4 can be formed from the mounting plate 421 and one of the first cutting member 422, the second cutting member 522 or the third cutting member 622, wherein each cutting member includes a blade plate 42. The first cutting element 41 and/or the second cutting element 43 is/are mounted on a face of the first cutting member 422 or a face of the second cutting member 522 or a face of the third cutting member 622. Further, the mounting plate 421 is mounted to the pivoting device 5. The mounting plate 421 and the blade plate 42 can be received together and removably mounted together. For instance, the first cutting member 422 or the second cutting member 522 or the third cutting member 622 can be removably placed inside the mounting plate 421 vertically or horizontally. Alternatively, it saves costs that the user is not required to replace the slicer in order to cut the food in different shapes by installing the first cutting member 422 or the second cutting member 522 or the third cutting member 622 for different cutting purposes. The quantity of the first cutting members 422 or second cutting members 522 is not restricted as long as the body 1 has a sufficient storage space. For instance, two first cutting members 422 or second cutting members 522 or third cutting members 622 and three first cutting members 422 or second cutting members 522 or third cutting members 622 can all be received inside the body 1.

Figure 12:
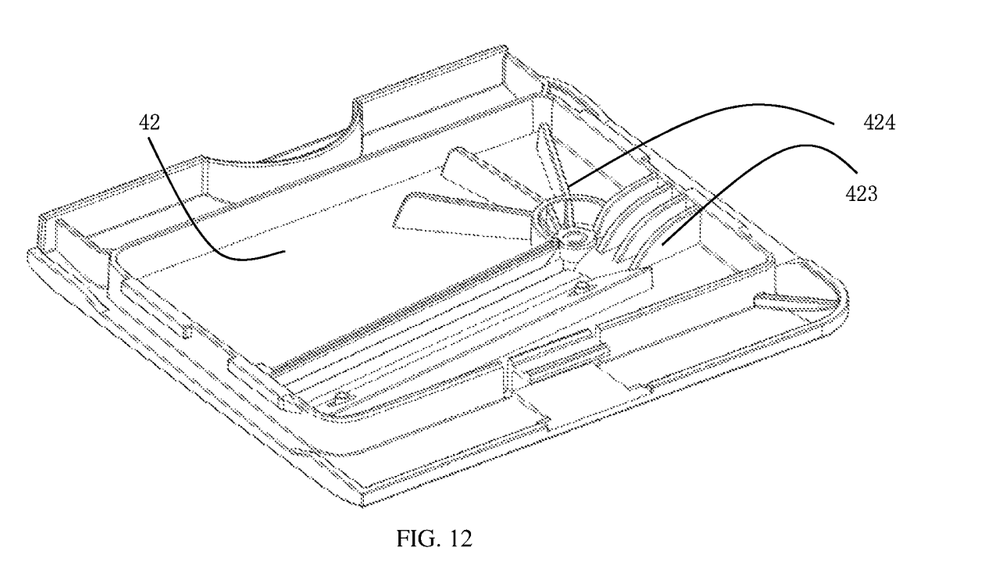
FIG. 12 is a view of a rear face of the food cutting device of FIG. 1.

Alternatively, a first face of the first cutting element is defined as a face of the first cutting member 422 or second cutting member 522 or third cutting member 622. A face opposing the above first face is defined as a second face of the first cutting element. A first guiding element 423 is arranged on the second face of the first cutting element for allowing the food being cut through the food cutting device 4 to be removed from the device smoothly. Further, the first guiding element 423 can prevent the food being cut through the food cutting device 4 from being broken up when moving towards the mounting plate. In this embodiment, in particular, four first guiding elements 423 are arranged in a parallel relationship. Referring to FIG. 12, without limitation on the shape of the first guiding element 423, it can be of a triangle shape, a rectangular shape, a sector shape, an arc shape and the like. It is preferable that at least two sides of the first guiding element 423 are fixedly mounted or removably mounted to the mounting plate or mounted to inner walls of a second face of the first cutting member 422 or second cutting member 522 or third cutting member 622. As such, when the user wants to cut the food to form a screw-like shape, the food after being cut through the first cutting member will move towards a direction along the first guiding element continuously from the first cutting member without being easily broken by the sides or frames or inner walls of the mounting plate. Alternatively, at least two second guiding elements 424 can be arranged on the second face of the first cutting member 422 or second cutting member 522 or third cutting member 622 at the same time in order for allowing the food being cut through the food cutting device 4 to be removed from the device smoothly. Further, the second guiding element 424 can prevent the food being cut through the food cutting device 4 from being broken up when moving towards the mounting plate. At least one side of the second guiding element is fixedly mounted or removably mounted to the inner wall of the second face of the first cutting member 422 or second cutting member 522 or third cutting member 622. Additionally, the arrangement of the above second guiding elements is not in a parallel relationship. Preferably, a plurality of second guiding elements 424 can be arranged as a relationship of a sector shape. In this embodiment, any food after being cut through the food cutting device 4 which are soft and/or difficult to be shaped can be prevented from being broken up by moving towards the mounting plate. Further, the cutting efficiency can be highly improved that the food after being cut can be moved out from the slicer along the second guiding element 424 effectively. Preferably, the first guiding element 423 can be construed as a projection portion from the second face of the first cutting member 422. The projection portion is mounted to the inner wall of the first cutting member 422. Preferably, an outer side of the first guiding element 423 can be of an arc shape.

In a third embodiment of the present invention, the food mounting device 3 comprises the driving element 32 and the mounting element 33. The driving element 32 is used for transmission of driving force. For instance, such transmission can be of hand-powered or motor-powered transmission. In this embodiment, the handle can be rotated by hand. The mounting element 33 is mounted to the driving element 32 and the first positioning element 31 respectively and can be moved or slid along the cover 2. The manners of the first mounting mechanism between the mounting element 33 and the driving element 32 and the second mounting mechanism between the mounting element 33 and the first positioning element 31 can either be identical or different. It is preferable that the above mounting mechanisms can be removable and particularly, it can be through thread mounting, riveting, bonding and the like. Alternatively, when the slicer is in a closed position or not in use, the driving element 32 or the first positioning element 31 can be dismounted for the purpose of utilizing the storage space of the slicer effectively. In this embodiment, the mounting element 3 is of an "L" shaped structure. By constructing this "L" shaped structure of the mounting element 33 of this embodiment, a frictional force created between the mounting element 33 and the face of the cover 2 becomes smaller, which is more convenient to move. Further, referring to FIGS. 2, 4, 8, 9 and 11, the food mounting device 3 further comprises a handle 74, the handle 74 can allow the user to perform the cutting process by using both hands to push and rotate the driving element 32 so as tos enhance the cutting efficiency. Alternatively, it is not necessary for the user to contact t the driving element 32 by hand directly in order to move the food forwards. The user only needs to hold the handle 74 to move the food so that the user can be keep away from the food being cut, thus avoiding both hands from being contaminated. The handle 74 is pivotally mounted to the mounting element 33 and is adapted for the use of either left-handed or right-handed users. The mounting element 33 can comprises a hole 73. The handle or driving element 32 can comprises a handle positioning element 72. An outer wall of the handle positioning element comprises a convex element which can be received by the hole 73 of the mounting element 33.

In another embodiment, the food mounting device 3 can comprises a second positioning element 34 being fixedly mounted to the food cutting device 4. Furthermore, as it is assumed that the food cutting device 4 is formed by a first cutting member 422, a second cutting member 522 or a third cutting member 622 and the mounting plate 421, the second positioning element 34 is therefore mounted to a first face of the first cutting member 422 or second cutting member 522 or the third cutting member 622. Preferably, the second positioning element 34 can be defined by a convex structure mounted on the first cutting member 422 or second cutting member 522. The second positioning element 34 comprises a first hole. The first hole is not shown in the drawings of this specification. The functions of the second positioning element 34 and the first positioning element 31 are similar, both of which can be used for food mounting. Particularly, an end of the food can be fixed on the first positioning element 31 and other end of the food can be fixed on the second positioning element 34.

Figure 1:
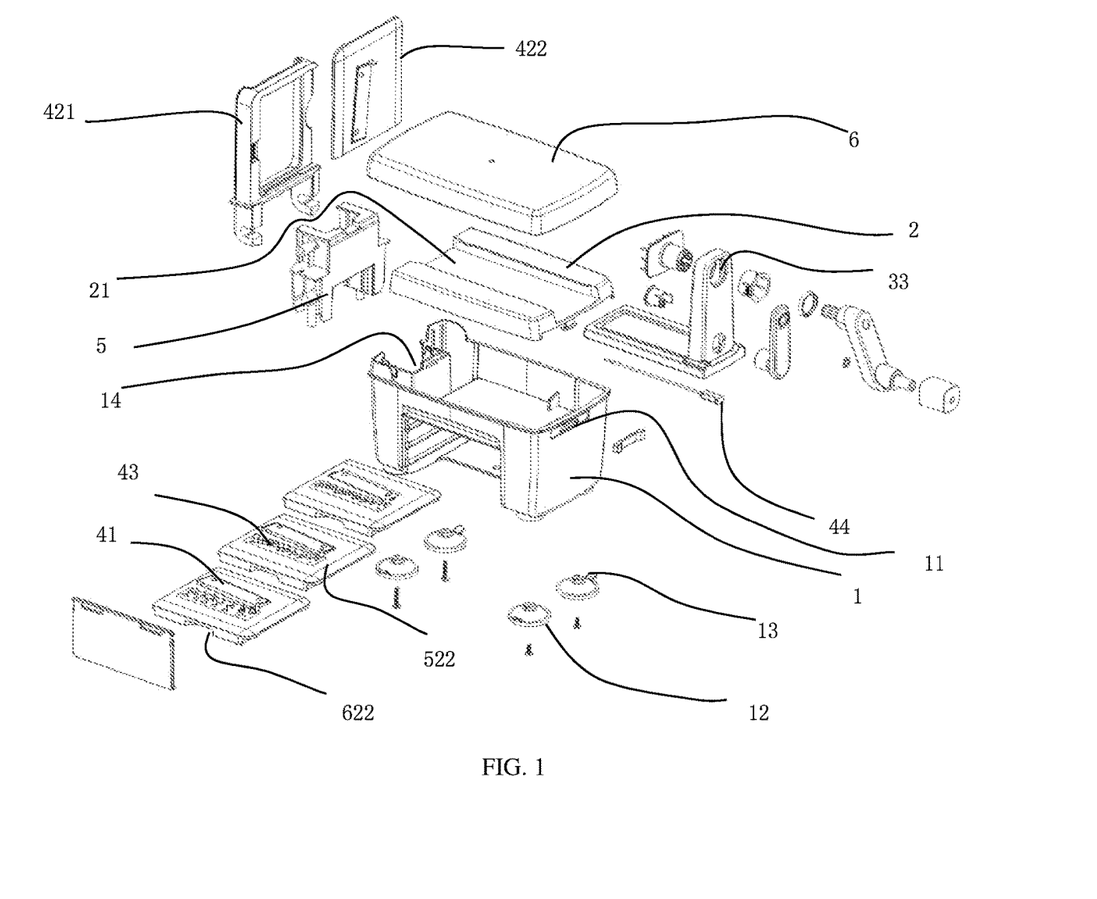
FIG. 1 is an exploded view of a slicer of a first embodiment of the present invention.
Figure 2:
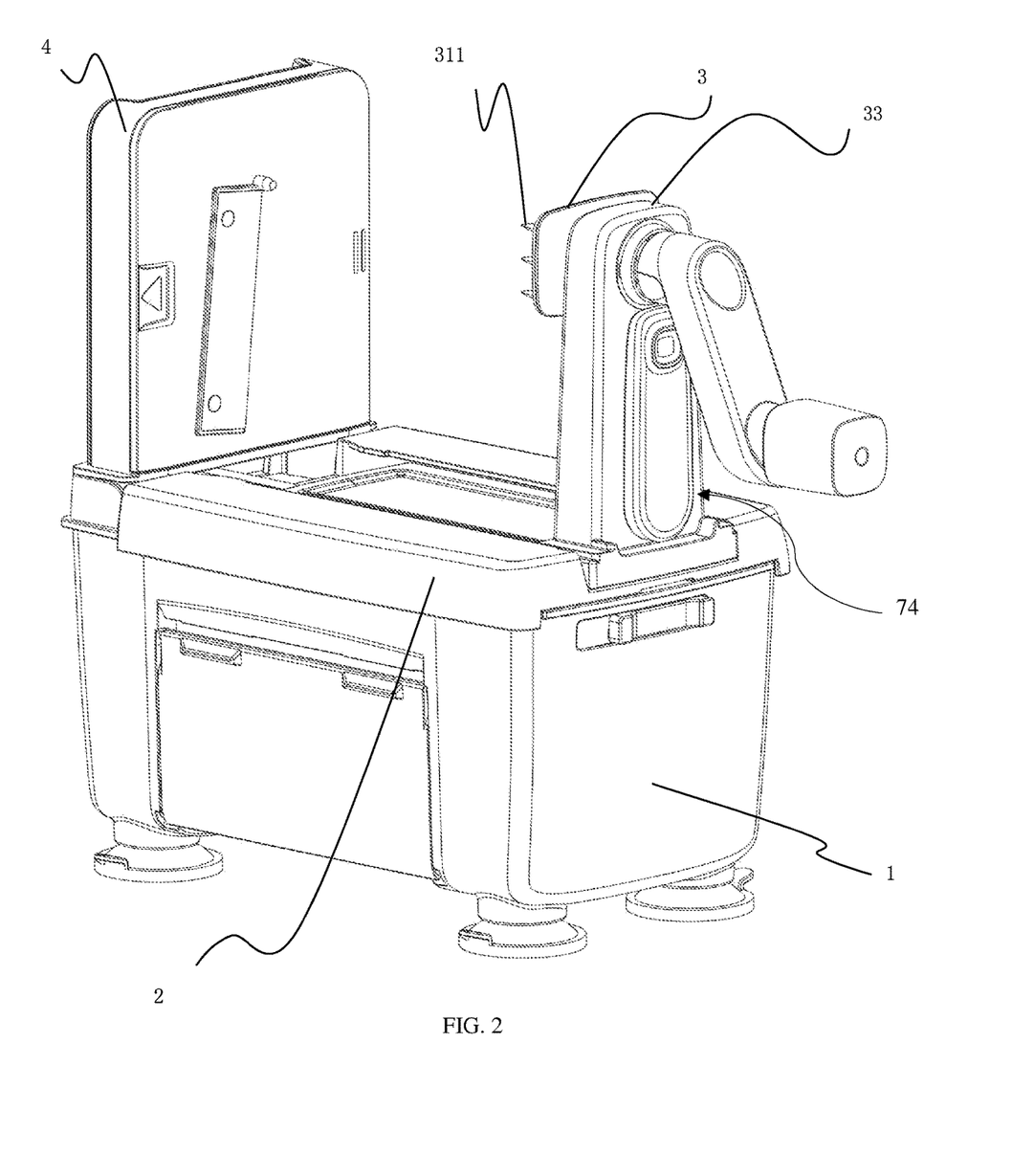
FIG. 2 is a first perspective view in an open position of the slicer of the first embodiment of the present invention.
Figure 3:
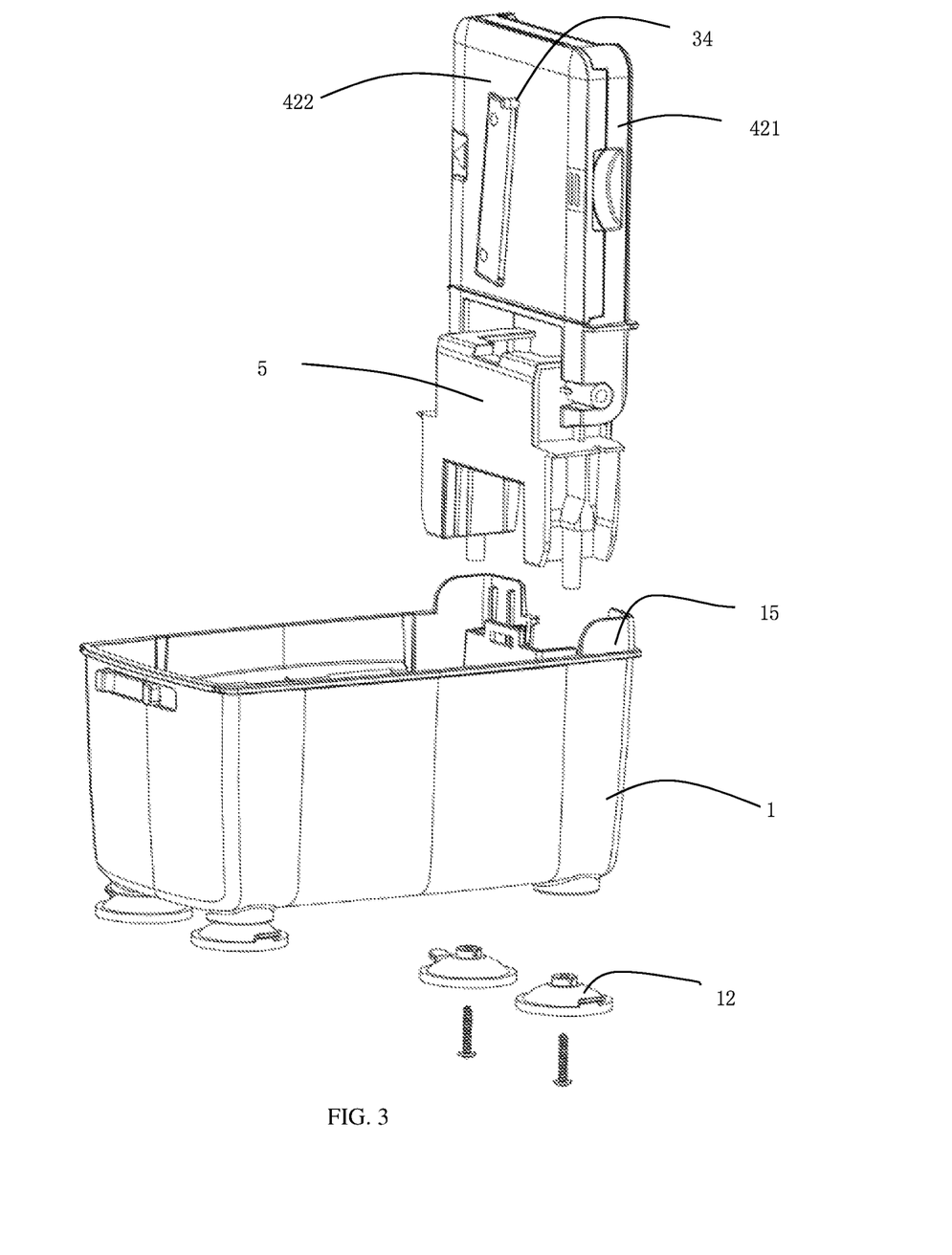
FIG. 3 is a second perspective view in the open position of the slicer of FIG. 2.
Figure 4:
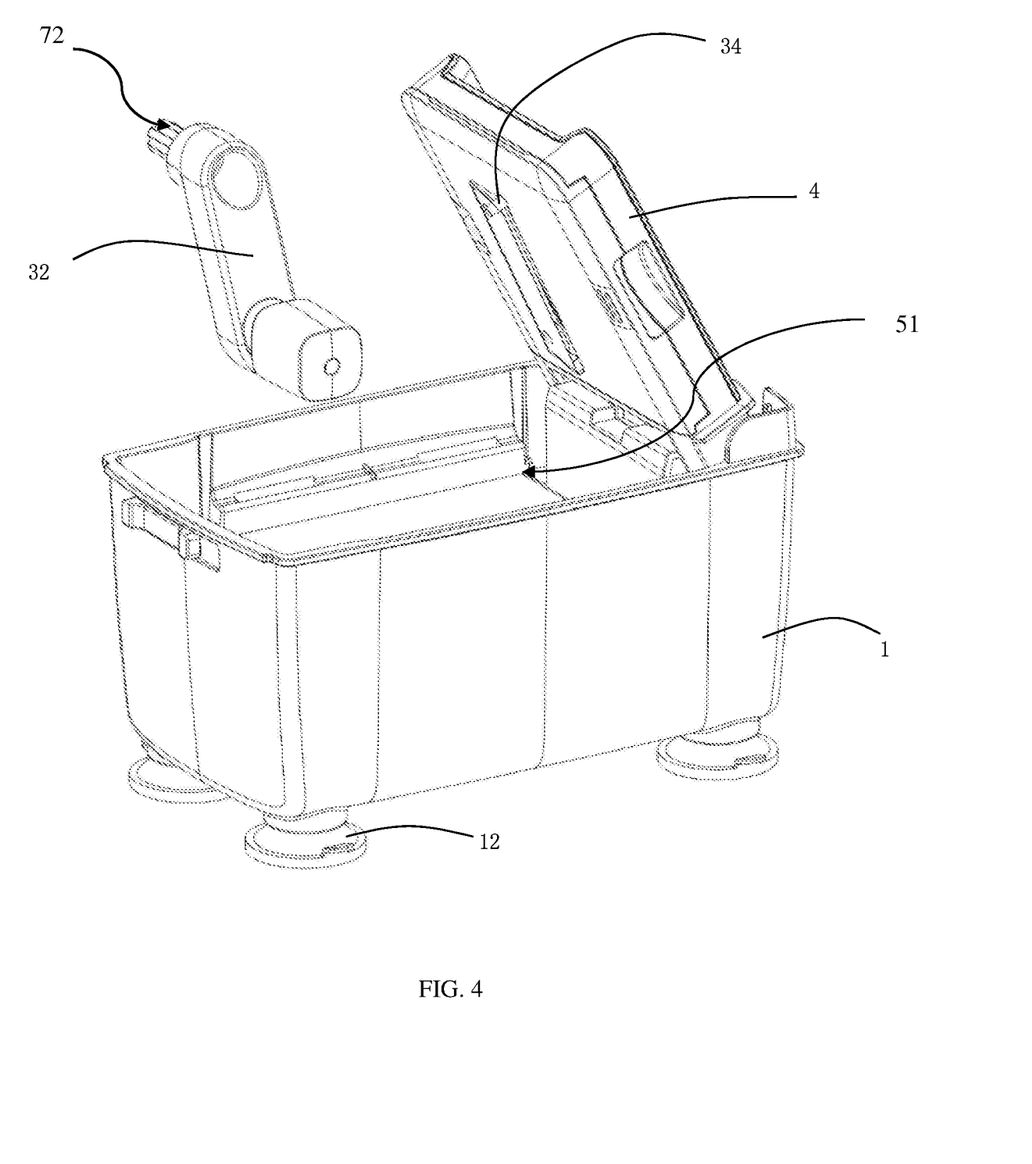
FIG. 4 is a third perspective view in the open position of the slicer of FIG. 2.
Figure 9:
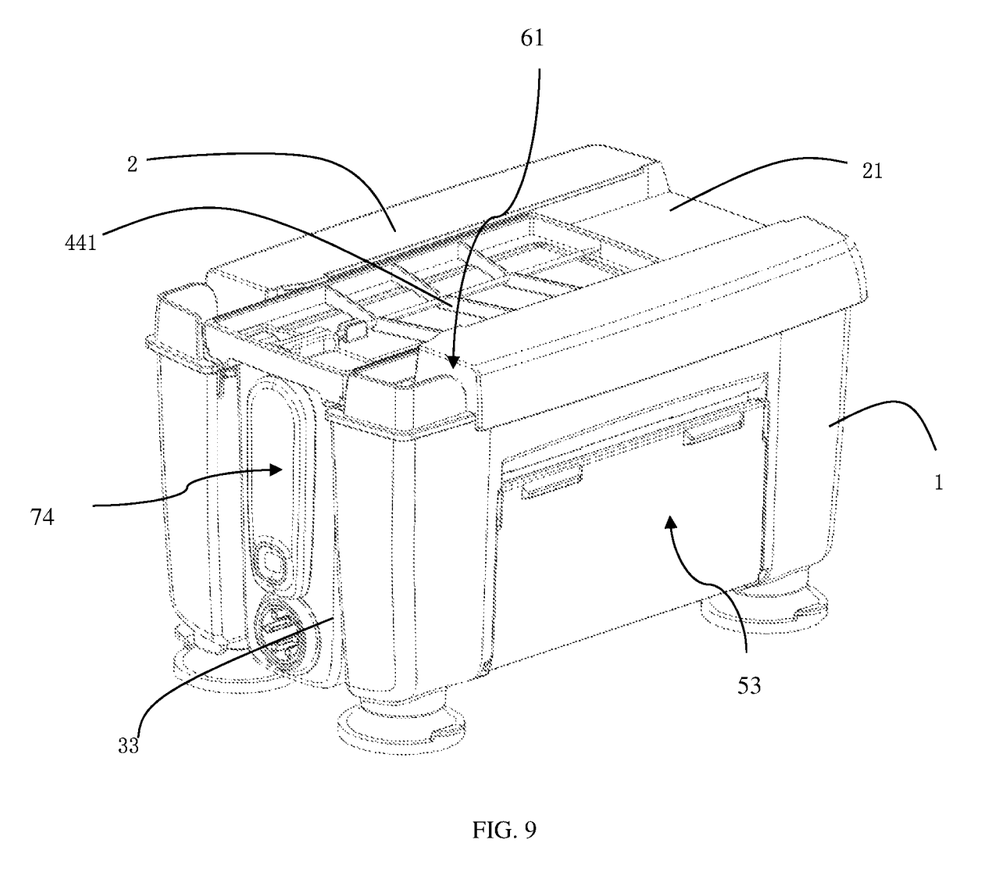
FIG. 9 is a third perspective view in the closed position of the slicer of FIG. 2.
Figure 10:
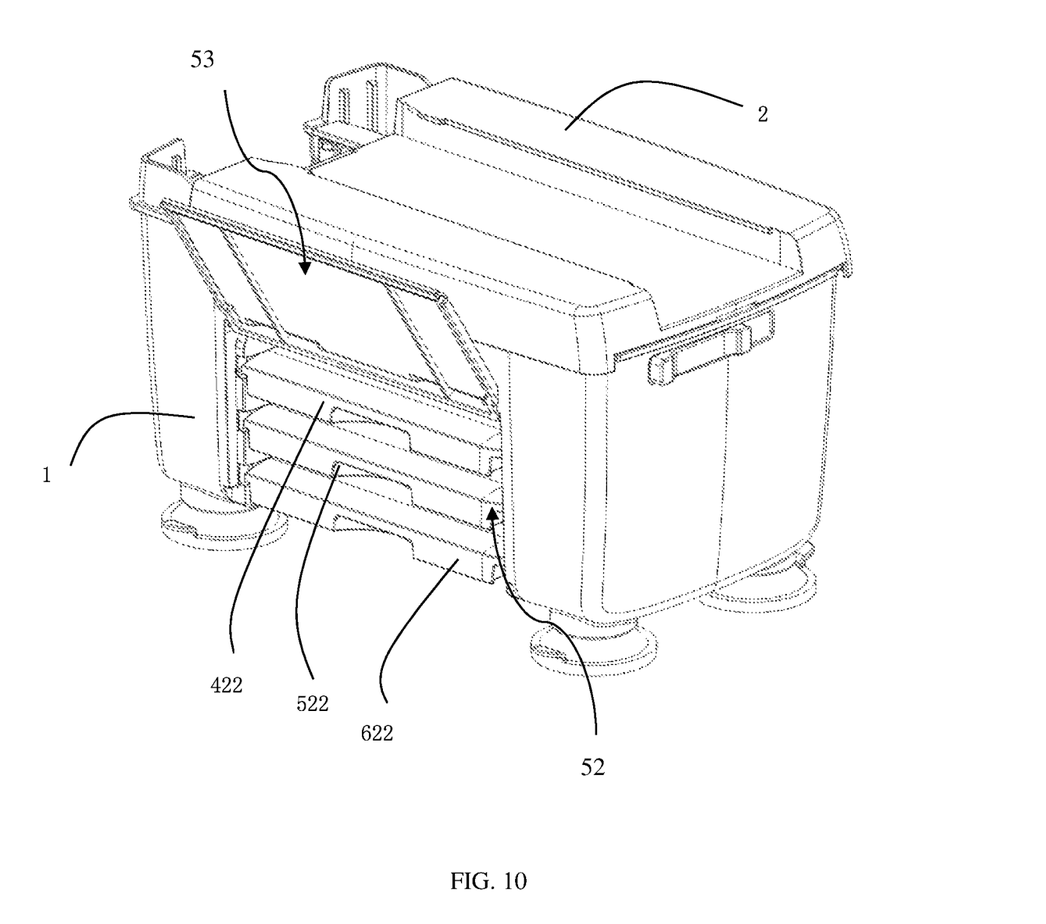
FIG. 10 is a fourth perspective view in the closed position of the slicer of FIG. 2.
Figure 11:
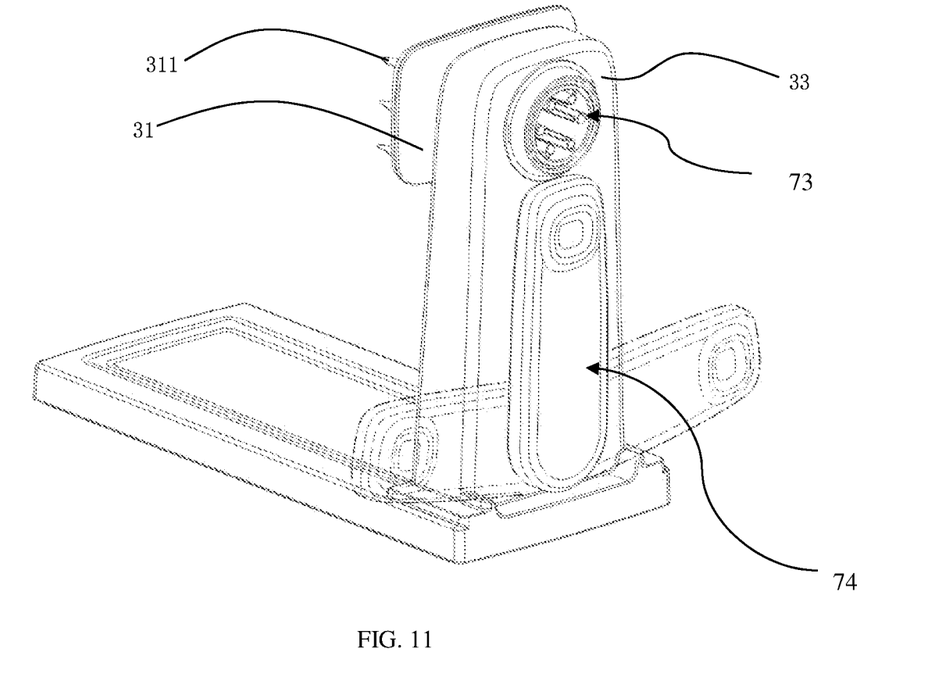
FIG. 11 is a view of a portion of the food mounting device of FIG. 2.
Figure 13:
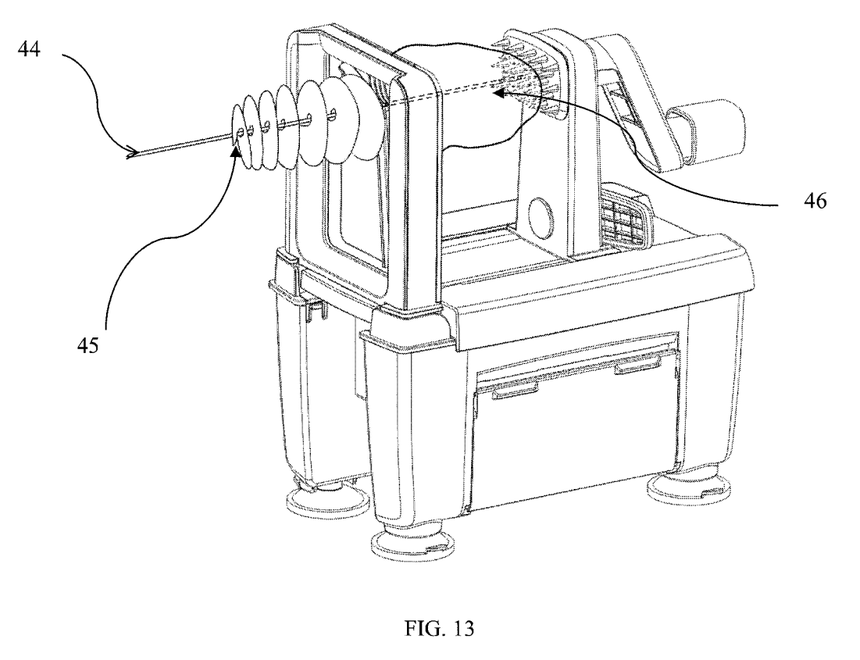
FIG. 13 is a perspective view of the longitudinal member of the slicer of FIG. 1.

Alternatively, referring to FIGS. 1, 9 and 13, the food cutting device 4 can further comprise a longitudinal member 44 which is removably mounted to the food cutting device 4, the sectional area of the longitudinal member 44 is preferably less than that of the first hole arranged on the first cutting member 422 or the second cutting member 522 or the third cutting member 622. As such, the longitudinal member 44 can be allowed to pass through the first hole. With respect to certain cutting requirements, for instance, the user expects to have a screw-shaped form of the food after cutting which is stringed together as an entire piece through the longitudinal member 44. To implement this requirement, the user can first use the longitudinal member 44 to pass through the whole of the food and then mount the food on the first positioning element 31. Afterwards, the longitudinal member 44 can be passed through the first hole and the user can therefore perform the cutting process of the slicer subsequently. Preferably, the mounting element 33 comprises the longitudinal member storage portion 441 for receiving the longitudinal member 44. Typically, the shape of the longitudinal member storage portion 441 is corresponded to the longitudinal member 44. Alternatively, referring to FIG. 13, the longitudinal member 44 can comprise a receiver portion 45 and a mounting portion 46. The receiver portion 45 which is vertically arranged on the second face of the first cutting member 422 can receive the food being cut through the food cutting device 4. The mounting portion 46 which is vertically arranged on the first face of the first cutting member 422 can mount the food between the food mounting device 3 and the food cutting device 4.

In a fourth embodiment, the face of the cover 2 can comprise a sliding track 21. The sliding track 21 enables the food mounting device 3 to effectively move along a given route on the face of the cover 2. In this embodiment, the widths of both two ends of the sliding track 21 can be the same or different. When it is the case that the widths of the two ends of the sliding track 21 are the same, it can be arranged that the width of a first end of the sliding track 21 from which the food mounting device 3 starts to slide is larger than the width of a second end of the sliding track 21. As such, the food mounting device 3 will then be stopped at the second end and cannot continuously move forwards. In this embodiment, damages of the slicer's parts caused by collision between the food cutting device 4 and the food mounting device 3 can be prevented from restricting continuous sliding movement of the food mounting device 3 along the sliding track 21 towards the food cutting device 4.

In this embodiment, alternatively, the body 1 can comprise a locking device 11, the cover 2 comprises a corresponding positioning device. When the locking device 11 is locked, the cover 2 and the body 1 is mounted together. Preferably, the cover 2 is mounted on top of the body 1 such that the cover 2 will not move relatively to the body and keep stable at a fixed position on the top of the body 1, that is perform cutting process smoothly when the slicer is under operation, in the open position or in the closed position.

Further, the body 1 can further comprise an anti-slippery device 12. In particular, it is a non-slippery mat, a sucking disc and the like. Alternatively, an anti-slippery handle 13 can be mounted to the anti-slippery device 12 for the purpose of positioning the slicer on a surface smoothly without any undesirable sucking caused by the anti-slippery device 12. For example, when the body is placed on a smooth desktop, the sucking disc will be function as the anti-slippery device 12 which can suck the body on the desktop very easily. At this time, it is a little bit difficult to move the body. However, if the anti-slippery handle 13 is arranged simultaneously, the anti-slippery handle 13 can be lifted up so as to eliminate any undesirable sucking caused by the anti-slippery device 12.

Alternatively, a second concave region 14 for receiving the mounting element 33 can also be arranged in a side portion of the body 1. Further, a positioning member 15 for limiting the rotational movement of the food cutting device 4 to a maximum degree of 90 degrees relative to the body 1.

Alternatively, the slicer can comprise the food residue receiver 6. When the slicer is in a closed position, the food residue receiver 6 can be mounted on the top of the cover 2 in order to avoid the slicer getting dusty. When the slicer is under operation or in the open position, the food residue receiver 6 can also be used a container for receiving the food after being cut.

The invention has been described in detail, with reference to certain preferred embodiments, in order to enable the reader to practice the invention without undue experimentation. However, a person having ordinary skill in the art will readily recognize that many previous disclosures may be varied or modified somewhat without departing from the scope and spirit of the invention. Accordingly, the intellectual property rights to this invention are defined only by the following claims.

I claim:

1. A slicer comprising:
a body comprising an open-end hollow structure;
a food mounting device;
a food cutting device; and
a cover;
wherein said cover is removably mounted on said open-end hollow structure of said body,
wherein said food mounting device is slidingly mounted in a concave region of said cover and adapted to be received within a concave region of a side portion of said body,
wherein said food cutting device is pivotable to a first position, vertical to said body,
wherein said food cutting device is pivotable to a second position, horizontal to said body, and received inside said body, and
wherein said body comprises a first receiving portion adapted for receiving said food cutting device inside said body.

2. The slicer according to claim 1, wherein said food cutting device is pivotally mounted to a pivoting device arranged in said body, said food cutting device being pivotable about said pivoting device to the first position vertical to said body and to the second position received inside said body.

3. The slicer according to claim 2, wherein said food cutting device comprises:
a first cutting member; and
a mounting plate,
wherein said first cutting member is removably mounted to said mounting plate.

4. The slicer according to claim 3, wherein said first cutting member comprises a first cutting element,
wherein said first cutting element is adapted for cutting the food being mounted to said food mounting device, and
wherein said first cutting element is mounted on said first cutting member.

5. The slicer according to claim 4, wherein said food cutting device further comprises a first guiding element arranged on a second face of said first cutting member, and
wherein said first guiding element is adapted for preventing the food being cut through said food cutting device from being broken up by said mounting plate.

6. The slicer according to claim 5, wherein at least two second guiding elements are arranged on said second face of said first cutting member,
wherein said at least two second guiding elements are adapted for preventing the food being cut through said food cutting device from being broken up by said mounting plate,
wherein at least one side of said at least two second guiding elements is mounted to an inner wall of said first cutting member, and
wherein said at least two second guiding elements are not in a parallel relationship.

7. The slicer according to claim 3, wherein said food mounting device comprises:
a first positioning element;
a driving element; and
a mounting element,
wherein said first positioning element is adapted to mount the food,
wherein said driving element is adapted for transmission of a driving force,
wherein said driving element and said first positioning element are mounted to said mounting element, and
wherein said mounting element is slidingly mounted on said cover.

8. The slicer according to claim 7, wherein said food mounting device further comprises a handle adapted for allowing the user to perform the cutting process by using both of the user's hands to push and rotate a driving element of said food mounting device,
wherein said handle is pivotally mounted to said mounting element and is useable by either a left-handed user or a right-handed user.

9. The slicer according to claim 7, wherein said driving element comprises a handle positioning element, an outer wall of said handle positioning element comprises a convex element which is received by a hole of said mounting element.

10. The slicer according to claim 3, wherein said food mounting device further comprises a longitudinal member adapted for receiving the food being cut by passing through said food cutting device, and
wherein said longitudinal member is removably mounted to said food cutting device.

11. The slicer according to claim 3, wherein said food cutting device further comprises a second positioning element mounted to a first face of said first cutting member.

12. The slicer according to claim 11, wherein said second positioning element is defined by a convex structure mounted on said first cutting member.

13. The slicer according to claim 2, wherein said body further comprises a pivoting device being arranged inside said body,
wherein an end portion of said mounting plate is pivotally mounted to said pivoting device, and
wherein said mounting plate is pivotable about said pivoting device.

14. The slicer according to claim 2, wherein said slicer further comprises a food cutting positioning member adapted for allowing said food cutting device to be of a fixed position which is vertically to the body during the cutting process, and
wherein said food cutting positioning member is positioned on an end portion of said cover facing said food cutting device.

15. The slicer according to claim 14, wherein said food cutting positioning member is an end face of said cover facing said food cutting device, and
wherein said end face of said cover is removably mounted to a corresponding face of said food cutting device.

16. The slicer according to claim 14, wherein a unitary "L" shaped structure is formed between said food cutting device and said cover.

17. The slicer according to claim 1, wherein said body further comprises a locking device,
wherein said cover comprises a positioning device, and
wherein said cover and said body are adapted to be mounted together when said locking device is in a locked position.

18. The slicer according to claim 1, wherein the concave region of said cover forms a sliding track adapted for allowing said food mounting device to move along a face of said cover, and wherein a width of a first end of said sliding track from which said food mounting device starts to slide is larger than a width of a second end of said sliding track.

\* \* \* \* \*